United States Patent [19]

Semenenko

[11] Patent Number: 5,775,544
[45] Date of Patent: Jul. 7, 1998

[54] APPARATUS FOR DISCHARGING FLOWABLE MATERIAL HAVING A CLOSURE AND AN OBTURATING DEVICE

[75] Inventor: Ivan Semenenko, Moreton-in-Marsh, United Kingdom

[73] Assignee: Matcon Limited, Moreton-in-Marsh, United Kingdom

[21] Appl. No.: 448,565

[22] PCT Filed: Feb. 23, 1994

[86] PCT No.: PCT/GB94/00361

§ 371 Date: Oct. 16, 1995

§ 102(e) Date: Oct. 16, 1995

[87] PCT Pub. No.: WO94/19265

PCT Pub. Date: Sep. 1, 1994

[30] Foreign Application Priority Data

Feb. 26, 1993 [GB] United Kingdom ............ 9303928

[51] Int. Cl.[6] .................................................. B67D 5/06
[52] U.S. Cl. .................. 222/181.1; 222/196; 222/504; 141/346; 141/349

[58] Field of Search ............................. 222/196, 504, 222/181.1, 476, 1, 199; 141/346, 368, 387, 287, 349

[56] References Cited

U.S. PATENT DOCUMENTS

| | | | |
|---|---|---|---|
| 4,470,524 | 9/1984 | Semenenko | 222/504 X |
| 5,036,894 | 8/1991 | Semenenko | 141/346 |
| 5,351,864 | 10/1994 | Semenenko et al. | 222/504 |

FOREIGN PATENT DOCUMENTS

0 297 494   1/1989   European Pat. Off. .

*Primary Examiner*—Gregory L. Huson
*Attorney, Agent, or Firm*—Shapiro and Shapiro

[57] ABSTRACT

An apparatus for discharging flowable material, particularly a powder or other particulate material, is provided with a hopper, bin, silo or the like having a discharge outlet with a closure, also known as an α-flange, and spaced therefrom a device, such as a cone, for obturating flow of material from the outlet, and a mechanism which is connectible with the obturating device and is operative to open the closure and obturating device in sequence. The mechanism also closes the obturating device and closure in reverse sequence.

22 Claims, 11 Drawing Sheets

APPARATUS FOR DISCHARGING FLOWABLE MATERIAL HAVING A CLOSURE AND AN OBTURATING DEVICE

The invention relates to apparatus for discharging flowable material, particularly particulate material which may be in the form of particles, grains, granules, powder, aggregate or the like, and which, when it is fine enough might be entrained in a gas.

Such material often, and usually does, generate dust or finer particles which can be suspended in air and which can fill working space. Moreover, such material is often housed in a hopper, silo or the like, and is discharged periodically therefrom to a container or receptacle such as an intermediate bulk container (I.B.C.) whence it is transported for future processing. For reasons of hygiene, health and environmental considerations it is often necessary that there is no deposit or build up of dust on external surfaces of the hopper and container, both of which usually have a flange or seal, respectively often called an α-flange and a β-flange at a union of the two vessels during transfer. This is particularly so where the particulate material is radioactive, or a pharmaceutical. Moreover, it is often the case that different materials are transferred, during batching processes from different hoppers to the same container, in which case there must usually be no residual material from a previous batch at the α-flange or the β-flange, to avoid what could be harmful cross-contamination. Previous attempts at solving these problems have proved cumbersome, complicated mechanically, expensive, labour intensive and in any event do not avoid the problem of cross-contamination as they involve the use of a glove box interposed between the hopper and the container, the interior of the glove box being contaminated with air-borne dust from whatever material has just been passed to the container. An example of a prior art system which goes some way towards solving these problems is EP 0 380 255.

It is accordingly an object of the invention to seek to mitigate these disadvantages.

According to a first aspect of the invention there is provided apparatus for discharging flowable material, comprising a hopper for the material having a discharge outlet with a closure and spaced therefrom within the hopper a device for obturating flow of material towards the outlet, and a mechanism which is connectible with the obturating device and is operative to open the closure and obturating device in sequence, the arrangement being such that the discharge outlet closure of the hopper is sealingly cooperable with a closure of a receptacle, characterised in that the mechanism is within the hopper.

Thus using the invention there may be provided a construction which seeks to provide a contamination-free operation. The closure may have a part of complementary internal configuration to an external configuration of part of the receptacle closure, whereby on engagement the parts are in sealing engagement. This is a relatively simple way of avoiding contamination.

The mechanism may be under, in use, the obturating device. This protects it from direct contact with particulate material.

The mechanism may include a suction means such as a vacuum means internally of the closure of the hopper for opening and closing in use the closure of the container. This is a readily operable arrangement.

The hopper closure and suction means may be carried by a transverse beam which is shiftable bodily by actuating means of the mechanism. This provides for positive reciprocation of the suction means. The actuating means may comprise bellows means.

The beam may support via vibration isolators a device for securing the mechanism centrally of the obturating device, particularly an inflatable annular device. The device may be an inflatable ring, which provides a firm central locking, particularly where there is a vibrator means.

The vibrator means may be adapted for cooperation with the obturating device.

The closure of the hopper and at least part of the mechanism may be housed in a collapsible shroud. This ensures that there is no dust contamination of the mechanism.

The closure may comprise a cone which may be reciprocable by actuating means for obturating and opening the outlet. This provides for a positive opening and closing action.

The actuating means may comprise a pneumatic lifting means, such as, preferably, a bellows means which is relatively simple to operate.

The vacuum means may be mounted by connector means with the actuating means.

The connector means may comprise a telescopic mounting means. This provides a relatively simple way of achieving actuation of the vacuum means, which may itself comprise a suction cup mounted on one end of the telescopic mounting means.

There may be a vacuum connection with the telescopic means whereby to provide a vacuum internally of the vacuum means. This provides an efficient way of providing a suction lift.

According to a second aspect of the invention there is provided, in combination, apparatus as hereinbefore defined, and a receptacle for flowable material which has a closure for an inlet for material and an annular lip seal at the inlet.

The inlet may include an annular rim on which the closure of the receptacle may be received in a closed position of the inlet. This provides for positive location.

The closure of the receptacle may have stop means against which the closure of the hopper abuts. This again provides for positive location when the combination is operative.

According to a third aspect of the invention there is provided apparatus including a hopper for flowable material comprising means associated with the outlet of the hopper whereby the outlet is isolated from the exterior.

The isolation means may comprise an annular ring and means to extract material therein. This provides for virtually total environmental protection.

The annular ring may comprise an angle ring, flexible skirt, and means to maintain the ring in position against the hopper outlet.

The means may comprise a plurality of piston and cylinder arrangements.

The ring may include means to direct washing fluid towards the outlet.

There may be vacuum means of the ring for cleaning the outlet. This ensures that contaminants are removed.

Apparatus for discharging flowable material embodying the invention is hereinafter described, by way of example, with reference to the accompanying drawings.

Referring to the drawings, there is shown in apparatus 1 for discharging flowable material, particularly a powder or other particulate material (not shown), comprising a hopper, bin, silo or the like 2 (hereinafter "a hopper") having a discharge outlet 3 with a closure 4 (in the form of a cap), also known as an α-flange, and, spaced therefrom a device 5, such as a cone, for obturating flow of material from the outlet 3, and a mechanism 6 which is connectible with the obturating device 5 and is operative to open the closure 4 and obturating device 5 in sequence. The mechanism 6 also closes the obturating device 5 and closure 4 in reverse sequence.

The discharge outlet 3 comprises a downwardly (as viewed) tapering throat 7 on the exterior of which is a wedge-shaped part 8 adjacent the free edge. The closure 4 or α-flange is a profiled cap on the interior of which is a suction means 9 in the form of a suction bellows. The suction means 9 passes through a top surface of the cap 4 and is connected with a hollow elongate member in the form of a lifting rod 10 which terminates at its upper (as viewed) end at a transverse bar or beam 11 to which it is secured, the underside of the bar or beam 11 being secured to actuating means in the form of a pneumatic bellows 12 by which the bar or beam 11 is raised and lowered. The bellows 12 is supported in the hopper 2 by spaced symmetrically arranged supports 13 such as a spider. Above the bar or beam 11 are vibration isolators 14 such as rubber pads and on these is mounted a further beam 15, parallel to the bar or beam 11 and which has an annular skirt 16 in which is seated securing means in the form of an inflatable annulus or tire 17. Centrally of the beam 15 there is an air vibrator 18 which has a tapered nose 19 for locating in a complementary shaped recess 20 in a boss 21 at the apex of the cone 5. The cone 5 also has an annular shoulder 22 and a thrust ring 23. The rod 10 and cap 4 are housed within a flexible shroud such as a tube 24 of flexible material such as rubber, plastic or the like, which tube 24 extends down to the free, lower annular rim of the cap 4.

The mechanism 6 is thus within the hopper 2, under the cone 5.

Figure 1:
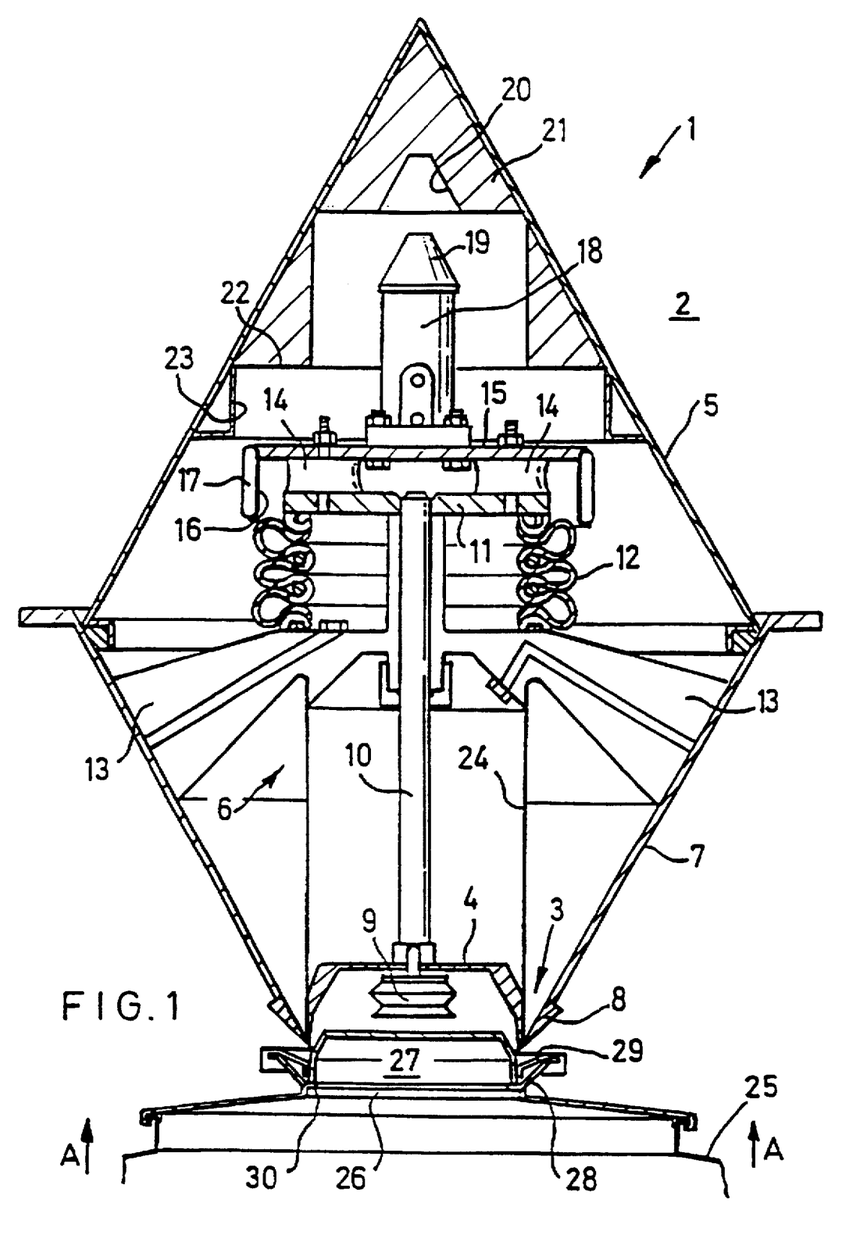
FIG. 1 shows in longitudinal cross-section, a hopper according to the invention, in a first operation step for combining with a container in a particulate material transfer sequence, the container being shown in part and also in longitudinal cross-section.

A container 25 such as an I.B.C. has an inlet 26 which is closed by a lid or cap 27, also known as a β-flange. The cap 27 sits in a flared entry or mouth 28 of circular cross-section which defines the inlet 26 and which has a flexible annular lip seal 29 positioned so as to be directed inwardly and to engage the cap 27 when the container 25 is closed, as shown in FIG. 1. The cap 27 sits on an annular lip or shoulder 30 in the inlet 26, and also has a stop or detent 31 (see FIG. 8) on which the cap 4 of the hopper 2 can sit.

It will be seen from the drawings that the external configuration of the cap 27 is complementary to the internal configuration of the cap 4.

In operation to pass particulate material from the hopper 2 to the container 25, the cap 4 of the hopper is at its lowermost extent with its annular free edge co-extensive with the annular free edge of the throat 7, and the cone 5 is in engagement with the throat 7 thus completely obturating the throat against flow of particulate material through the throat towards the outlet 3. The cap 27 of the container 25 is in position in the flared entry or mouth 28 mounted on the lip or seat 30. The lip seal 29 is pressed against the outside of the cap 27 and is bent down at its free edge towards the container 25 to make a secure seal.

In a filling operational sequence the container 25 is maneuvered to be below the hopper 2, the respective outlet 3 and flared entry or mouth 28 being vertically aligned, or at least substantially so.

The container 25 is then raised in the direction of arrows 'A', FIG. 1.

Figure 2:
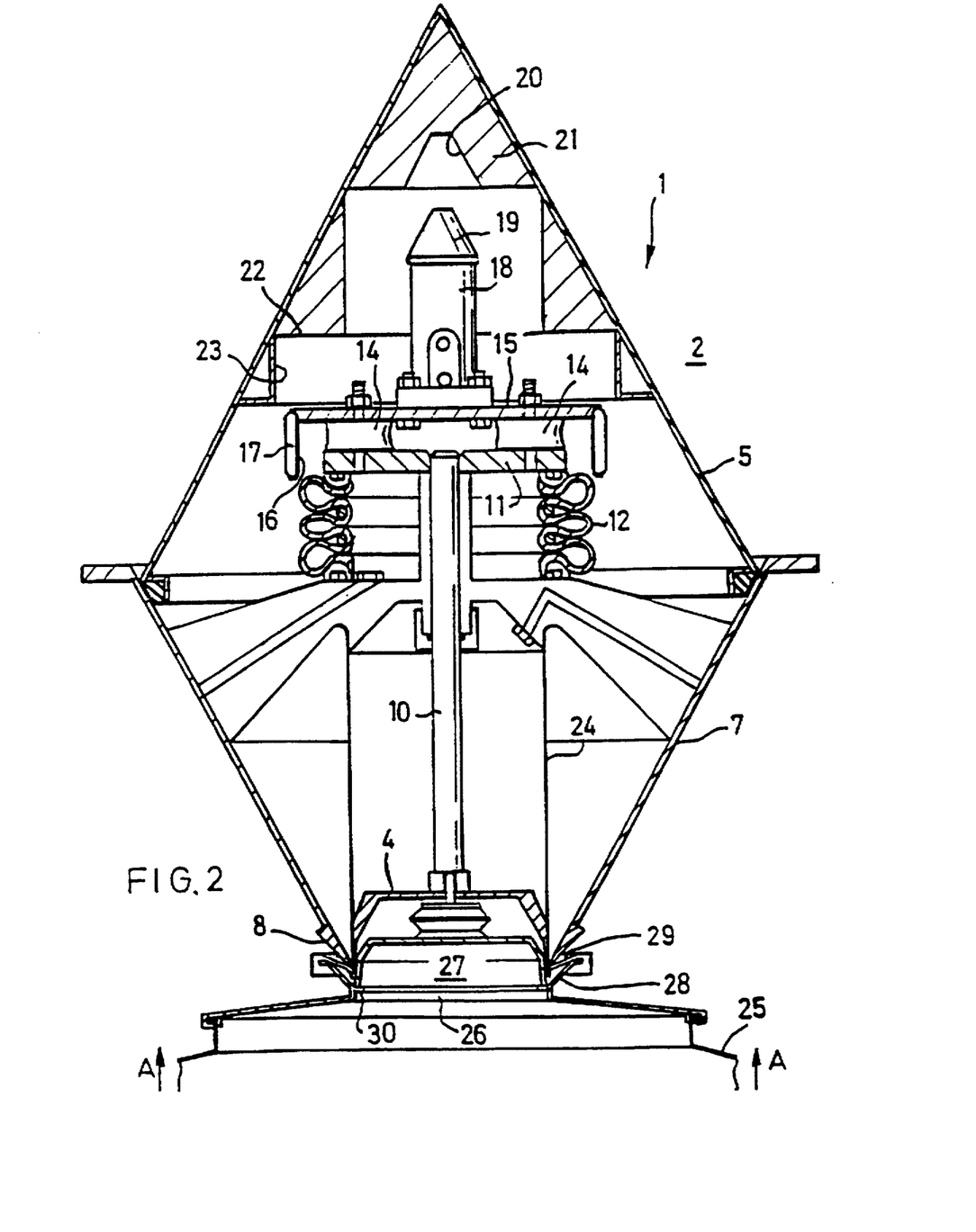
FIG. 2 shows the hopper and container in a second operation step of the sequence.

The lifting force is continued, which deflects the lip seal 29 down as the edge of the throat 7 is brought into engagement with it and the external seal 8 of the throat. Thus the external surfaces of the throat 7 and of the lip seal 29 being in contact are isolated from the external and internal environment, FIG. 2.

Figure 3:
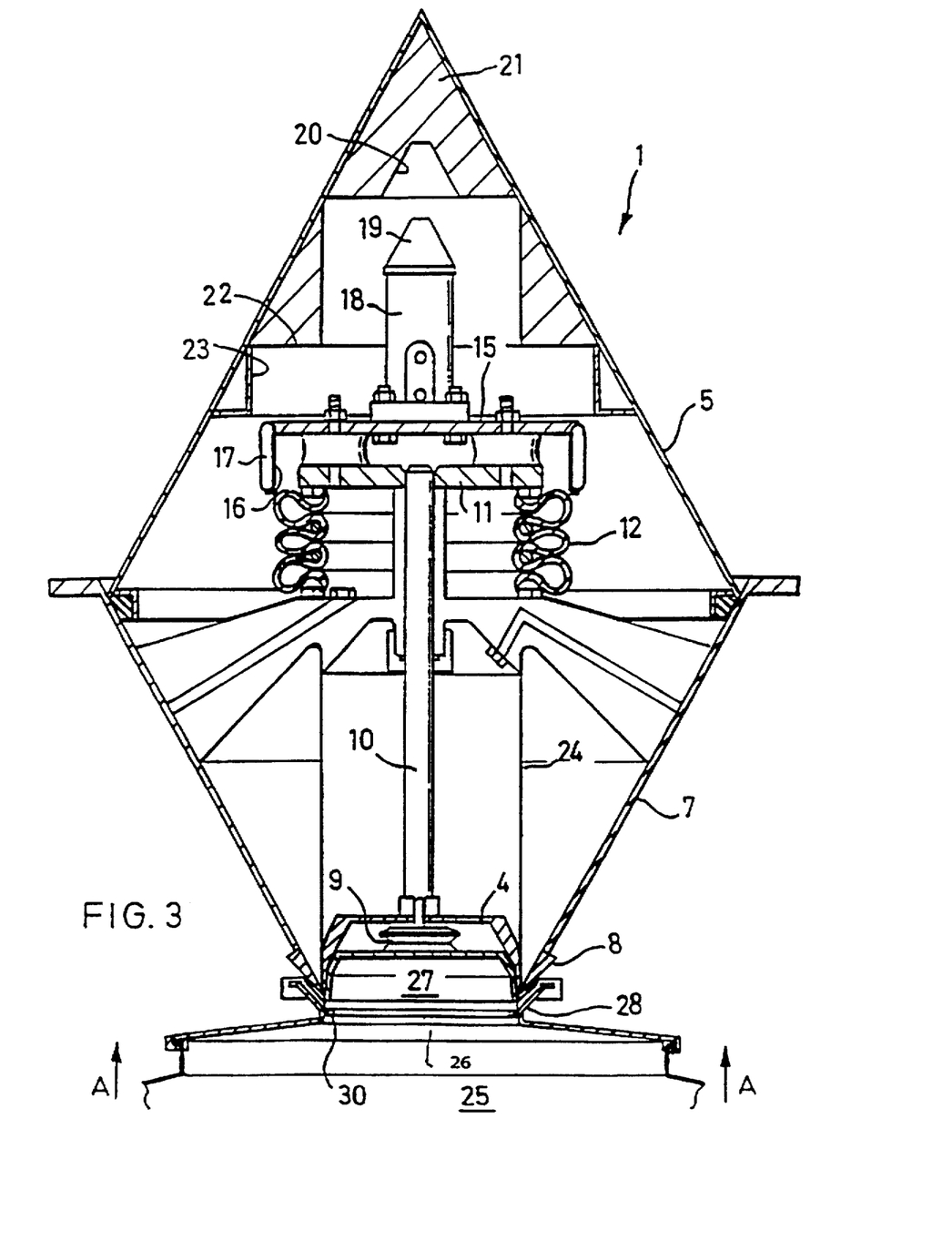
FIG. 3 shows a third operational step in the sequence.

Then, the suction bellows means 9 is actuated so reducing the distance between the tops of the caps 4, 27 and therefore sealing the interior surface of the cap 4 and the exterior surface of the cap 27 against exposure to the internal environment as they are closely machined to a fine degree of tolerance to provide a close, snug fit, (FIG. 3). This suction action also raises the cap 27 off the lip 30, the cap 4 of the hopper 2 engaging the lip 31 of the cap.

Figure 7:
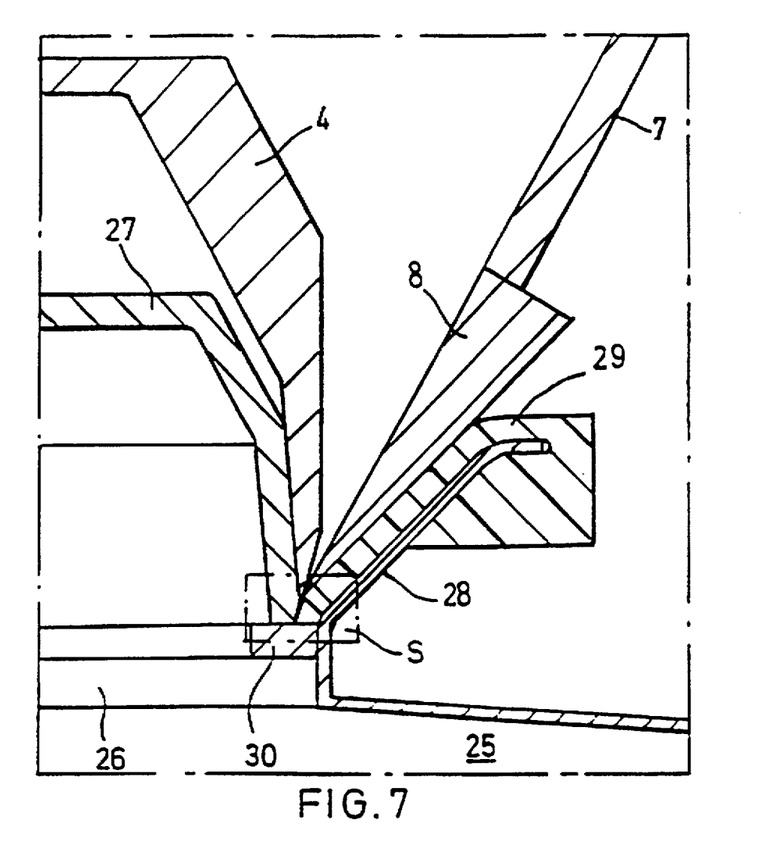
FIG. 7 shows the part of FIG. 4 indicated 'R' to an enlarged scale.
Figure 8:
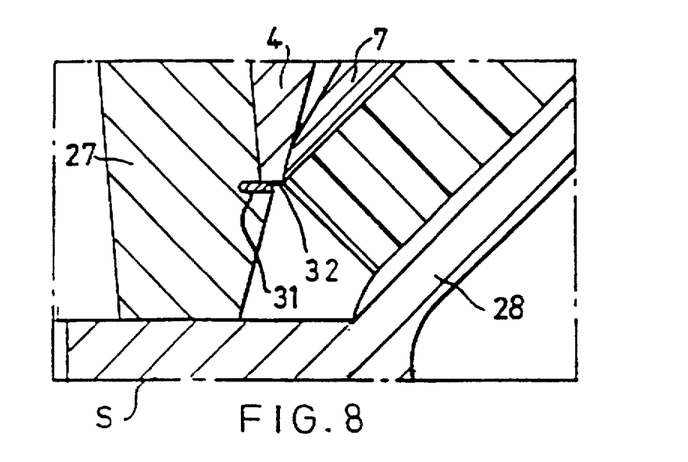
FIG. 8 shows the part of FIG. 7 indicated 'S' to a yet further enlarged scale.
Figure 9:
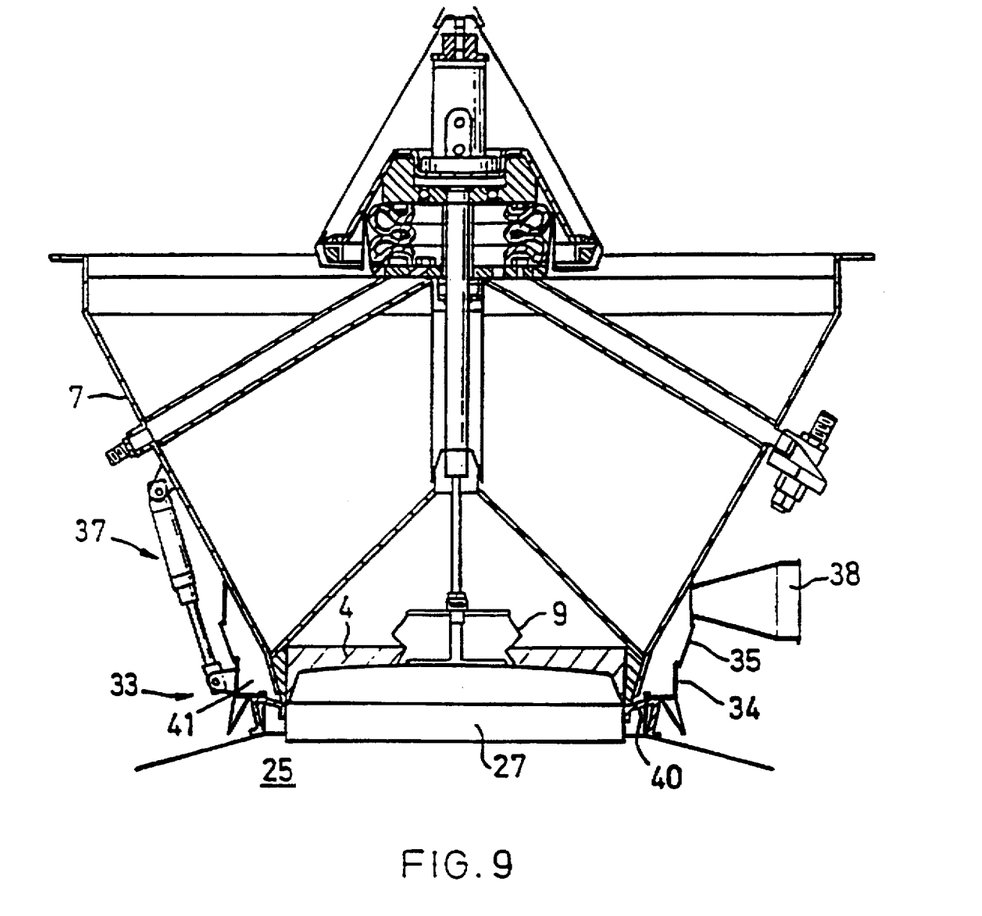
FIG. 9 shows a further embodiment or apparatus in transverse cross-section, in a first operational step.
Figure 10:
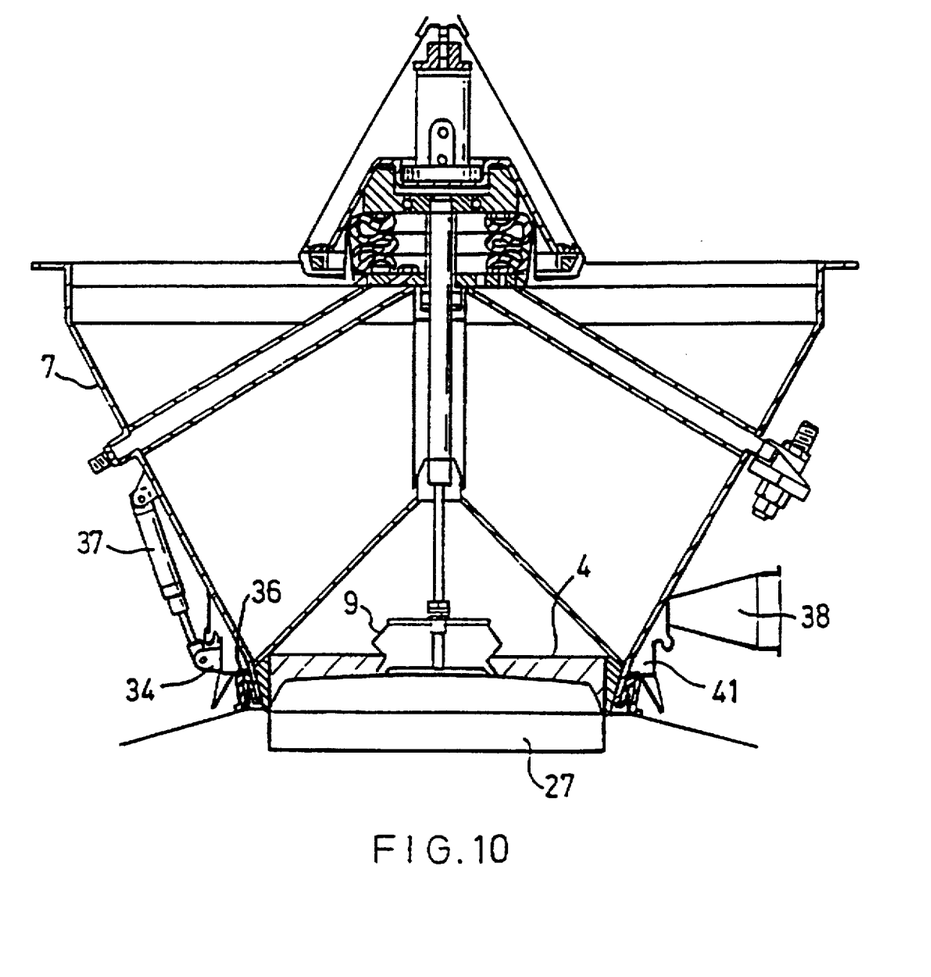
FIG. 10 shows the embodiment of FIG. 9 in a second operational step.
Figure 11:
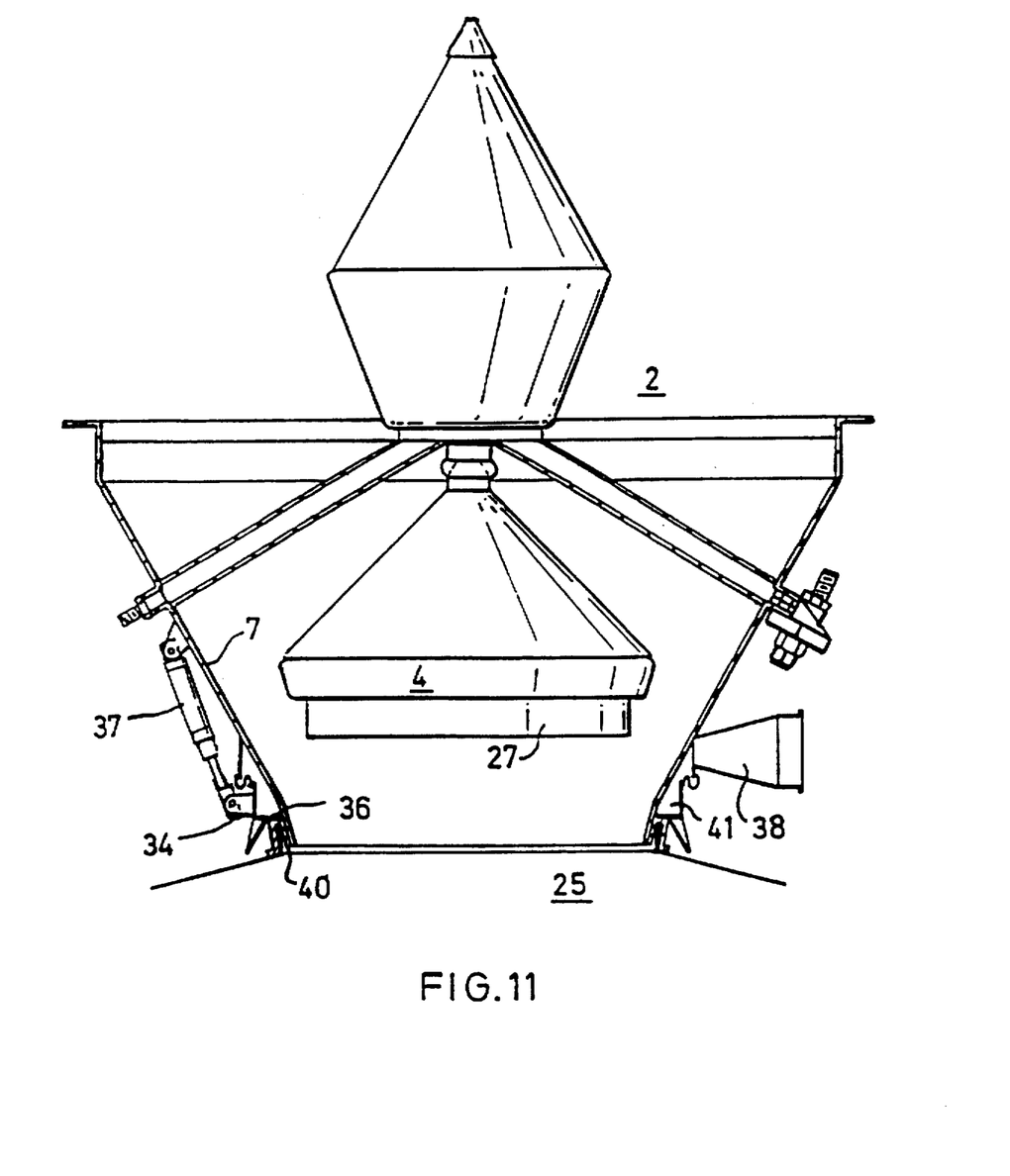
FIG. 11 shows the embodiment of FIGS. 9 and 10 in a third operational step.
Figure 12:
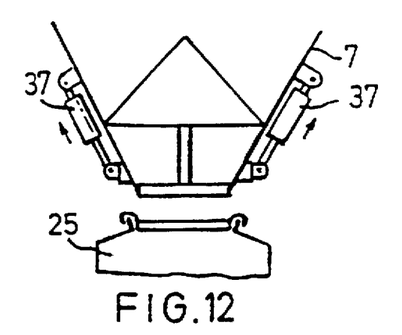
FIGS. 12 to 16 show schematic operational steps in use of the embodiment of FIGS. 9 to 11.

The upward lift of the container 25 is continued, until the cap 27 again seats on the lip 30, so completing the folding of the lip seal 29 to make a tight fit against the throat 7 and bottom of the cap 4 of the hopper 2, there being, owing to fine machine tolerances, only a lateral length of a micron or so of the end of the cap 4 uncovered. This is shown in FIGS. 4, 7 and 8.

Figure 4:
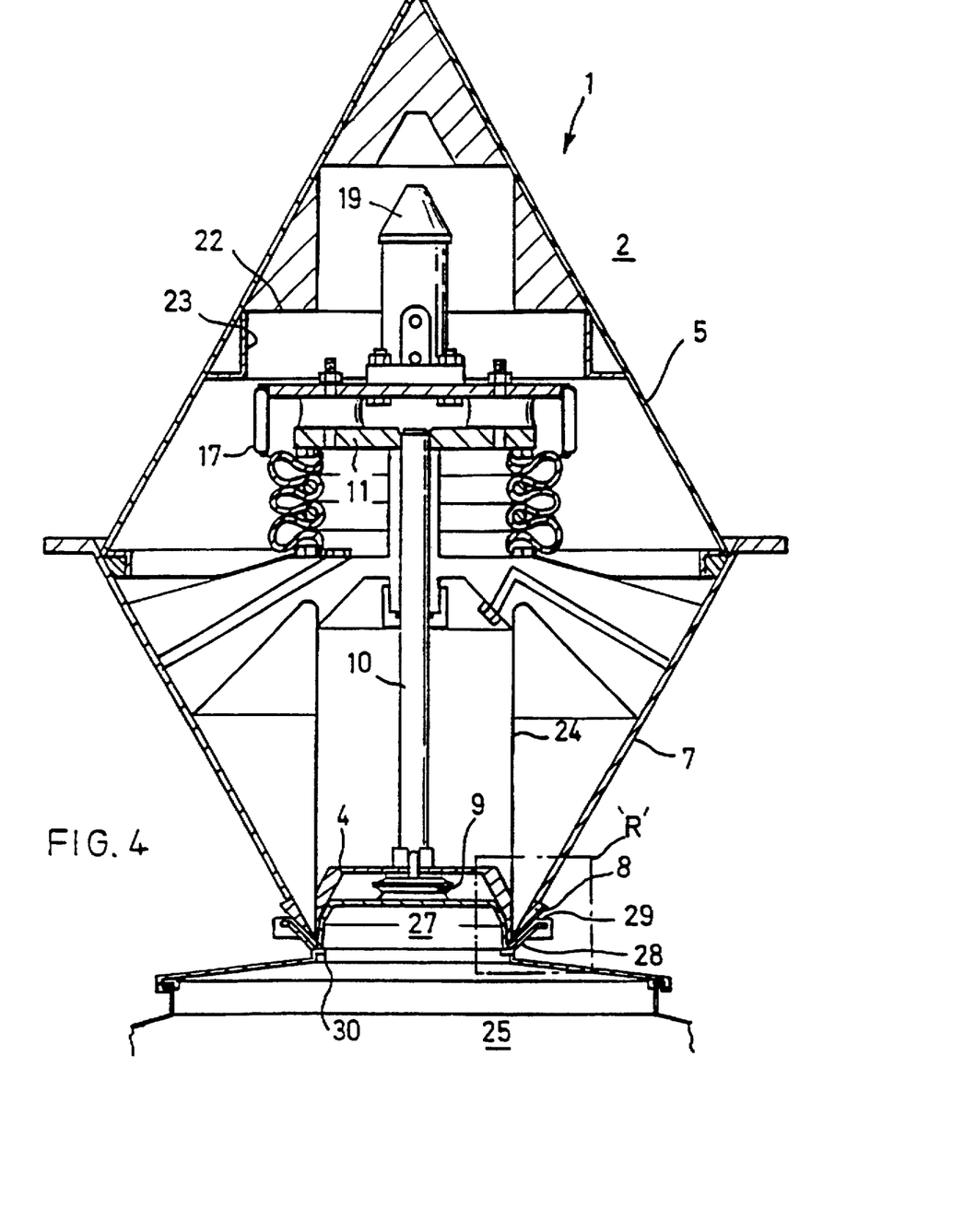
FIG. 4 shows a fourth operational step in the sequence.

The hopper 2 and container 25 are thus in the FIG. 4 position, secured together with the seals 8, 29 including the respective caps 4 and 27 or α- and β-flanges in sealing engagement.

The mechanism 6 is then actuated by inflating the bellows 12, at a relatively low pressure typically in the range 50–100 millibars. This action raises the bar or beam 11, and hence the vibrator 18, until its frusto-conical end 19 seats in the complementary recess 20 in the boss 21 on the underside of the cone 5.

Figure 5:
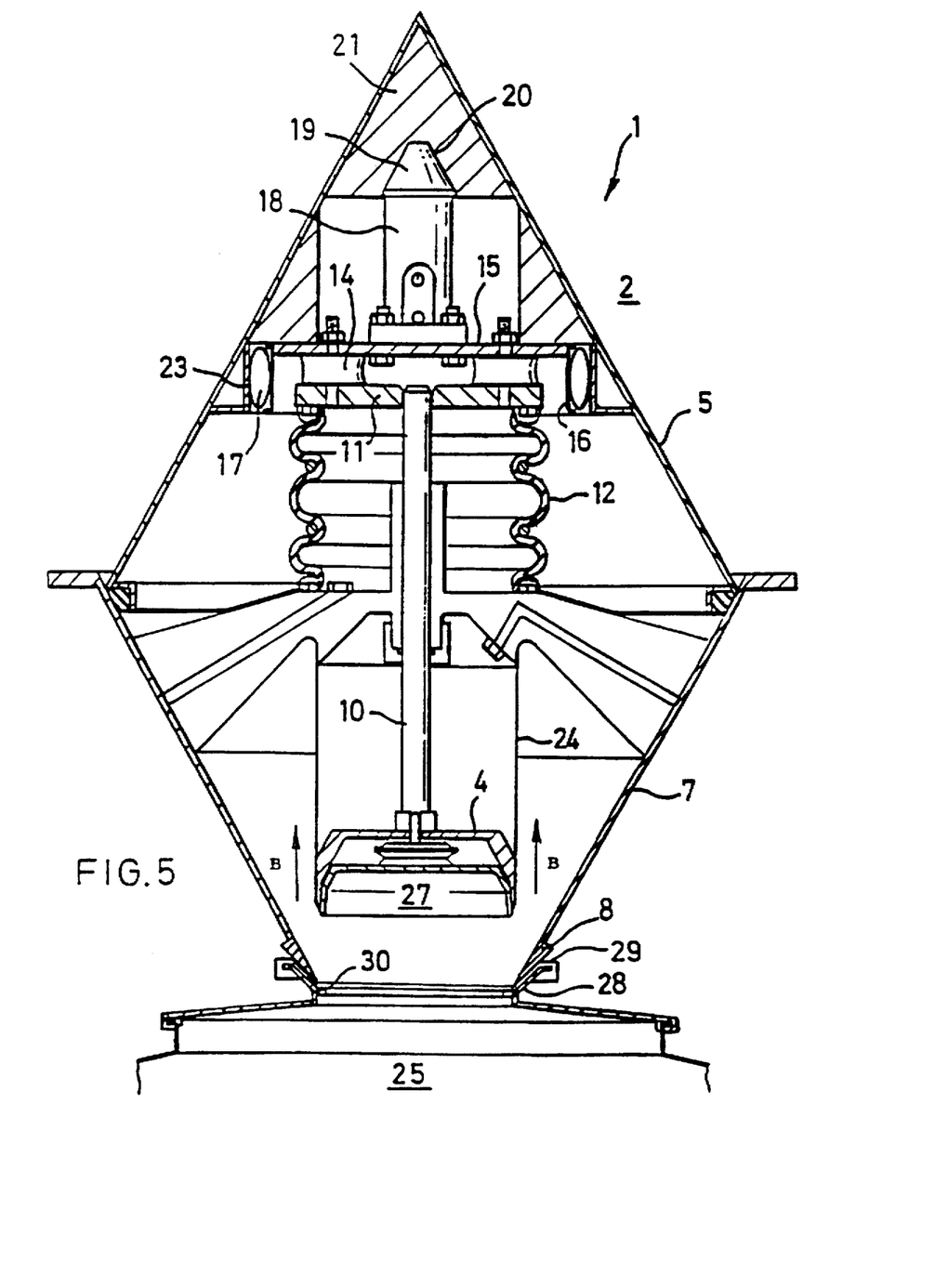
FIG. 5 shows a fifth operational step in the sequence.

This action also necessarily lifts the rod 10, and hence the engaged caps 4 and 27, the vacuum being maintained to lift the cap 27 and to ensure that it remains in sealing-engagement with the cap 4. This lifting action is shown in FIG. 5 by the arrows 'B', and stops when the beam 15 engages the stop or shoulder 22.

In this position, the annular ring or tire 17 is inflated and this therefore expands radially and lockingly engages the shoulder 23 so ensuring correct centring of the mechanism 6.

Figure 6:
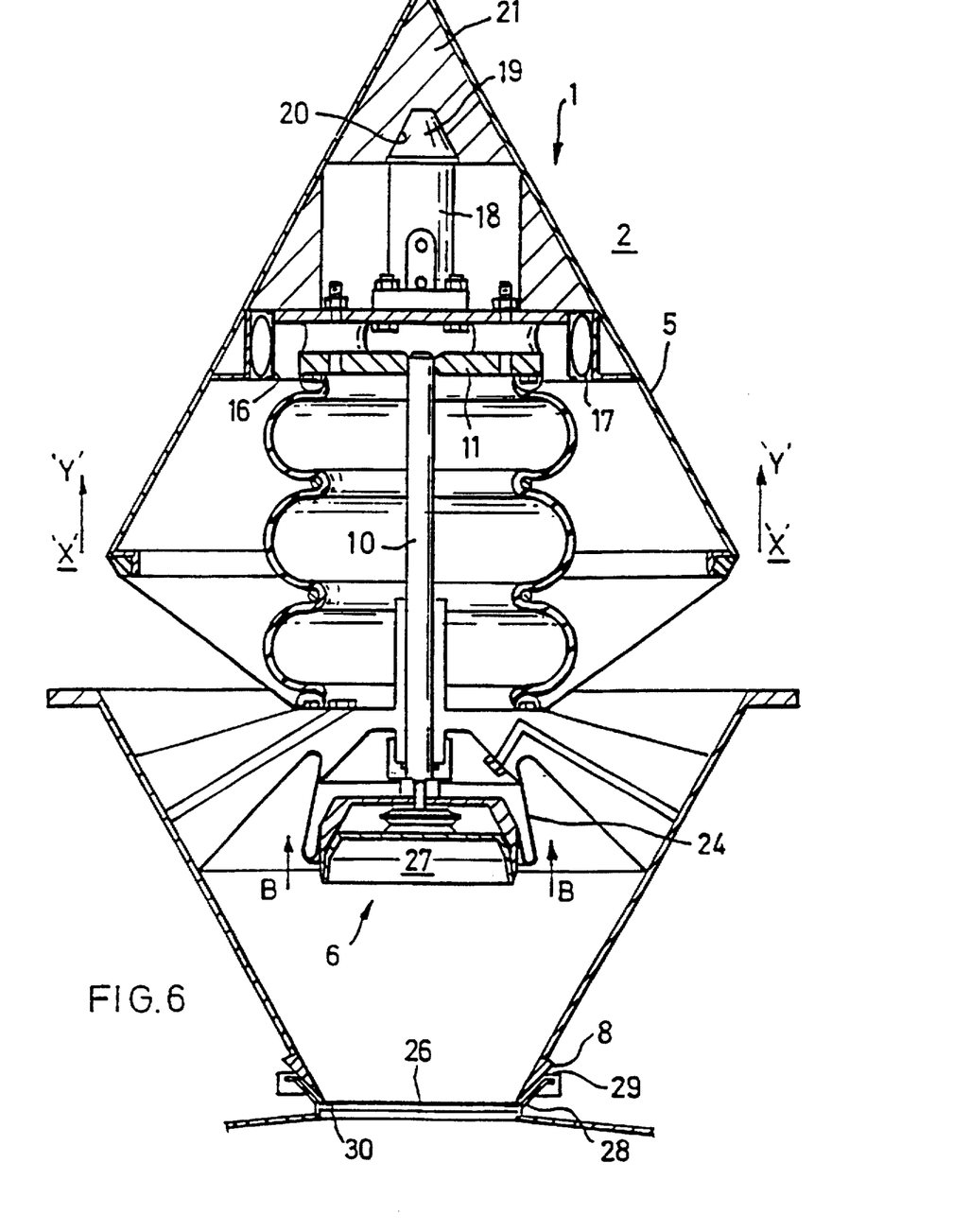
FIG. 6 shows a sixth operational step in the sequence.

The bellows is then expanded at a relatively much higher pressure, typically 2 to 7 bar, which action raises the cone 5 off the throat 7 in direction 'Y', to FIG. 6, to provide an annular gap 'X' through which particulate material flows, the vibrator 18 being actuated to vibrate the cone 5 and hence material above it in the hopper to overcome bridging or rat-holing, so providing a smooth annular flow of material through the gap 'X' and the throat 7 to the outlet 3 and thence into the container 25 (FIG. 6). The combined caps 4, 27 are raised sufficiently high by the mechanism 6 for them to be clear of falling material. However the environment in the throat 7 does become charged with dust from the material, which can then settle on the interior of the cap 27 of the container 25, the other surfaces and the rest of the mechanism 6 being protected by the tube 24. At the outlet/inlet connector 3, 26 no external surface is exposed to dust as the external surface of the throat 7 is firmly sealed with the external surface of the lip seal 29.

When the required amount of material has passed to the container 25, the reverse sequence of operation of the mechanism 6 is carried out, the vibrator 18 having been stopped. The high pressure is then reduced, so lowering the cone to engage the throat once more, so cutting off the flow of material. The reduced pressure then allows the bar or beam 11 to fall, the annular tire is deflated 17, and the combined caps 4, 27 re-engage in the outlet 3. In this position the outer rim of the annular free edge 32 of the cap of the hopper seals against the free edge of the throat 7 so preventing it from coming into contact with the external environment, (see FIG. 8) and the free edge of the cap 27 of the container 25 seats on the lip 30, while the lip seal 29 engages the outer surface of the cap 4 (see FIG. 2, e.g.) so that exposure to the outside environment is again obviated. A vacuum is then applied through the suction bellows means 9 to ensure a final, positive, seating of the cap 27 in the inlet 28 and the mechanism 6 is then operated to lift the cap 4 of the hopper 2. The external surface of the cap 27 is now exposed to the external environment, but as it was sealed by the cap 4 against contact with dust, there is no risk of contamination. Likewise, the interior of the cap 4 of the hopper 2 was sealed against contamination with dust by the cap 27 so again there is no risk of contamination of the external environment. Finally, the external surface of the cap 4 of the hopper 2 being internal of the throat 7 in FIG. 1 and sealed against contact with the external environment by the free edge and seal 8 of the throat 7 which were themselves sealed against contact with dust by lip seal 29 ensures that no dust contamination of the external environment from that area is obtained.

Thus as all the surfaces exposed to dust are sealed against exposure to the environment it can be seen that the apparatus 1 forms a virtually 100% total containment system for maintaining material in the hopper 2 and container 25 and not in the external environment, and also avoids cross-contamination from batch to batch of material being discharged.

It will be understood that modifications may be possible. For example, the lifting height may be adjustable by varying the lift or making the length of the rod 10, adjustable. Also, there may be two lifting mechanisms 6, one for the caps 4, 27 and one for the cone 5, rather than the unified mechanism disclosed. Also, the inflatable annulus may be omitted.

Figure 17:
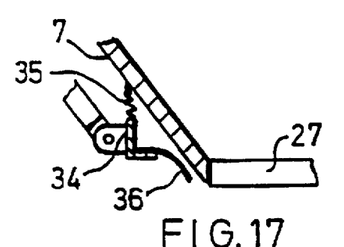
FIGS. 17 to 19 show enlarged details of α-, β-flange arrangements in the embodiment of FIGS. 9 to 16.

FIGS. 9 to 19 shown an embodiment in which there is a means 33 for cleaning the cap 4 or the hopper 2. The cleaning means 33 comprises a member in the form of a rolled annular angle metal ring 34 which has an annular flexible skirt 35 secured by suitable means to its upper (as viewed) edge and to the hopper throat 7. There is also a flexible lip seal 36 (see FIG. 10) at its lower limb or face which is annular and engages snugly around the hopper outer surface. In FIG. 17 it can be seen that, with the ring 34 in an upper, raised, position, the skirt 35 and lip seal 36 completely surrounds, closes and isolates the lower (as viewed) part of the external surface of the hopper 7. The ring 34 is supported by actuating means in the form of three equiangularly spaced piston/cylinder arrangements 37, (one being shown in FIGS. 9 to 19 and two in FIG. 12), the respective cylinders being pivotably connected with the hopper throat 7 and the free ends of the pistons-being pivotably connected with the ring 34.

There is evacuation means 38 whereby the interior of the ring 34 can be evacuated or exhausted, and a ring or jet 39 (FIG. 14) directed to the joint or connection 32 (see FIG. 8) between the cap 4 of the hopper 2 and the cap 27 of the container 25 in the combined position for material discharge.

There is also a double lip seal 40 around the bottom edge or outlet of the hopper throat 7, mounted on the container 25.

Figure 13:
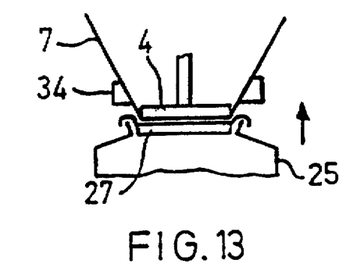
Figure 18:
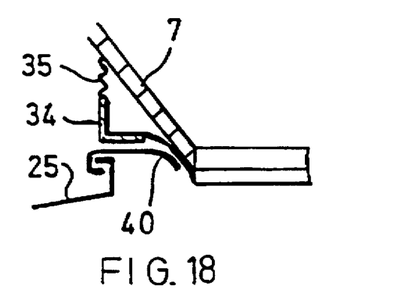
Figure 19:
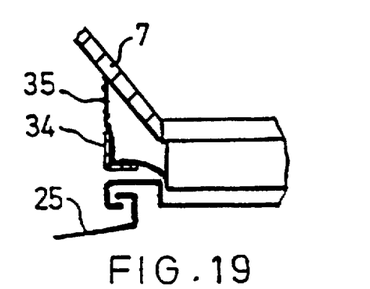

In use, at the start of an operation, the piston/cylinder arrangements 37 are actuated to pull the ring 34 upwardly and tight in its highest position. The container 25 is then in a ready to lift position, as in FIG. 1. The container 25 is then raised, and the sequence described with reference to FIG. 2 to 4, 7, 8 takes place, to effect vacuum clamping of the caps 4 and 27 together, and so that the container lip seal 40 engages round the hopper outlet (FIG. 4), as shown in FIGS. 13, 18.

The hopper 2 and flared entry or mouth 38 are then opened, FIGS. 5, 6, as before, or by any other suitable mechanism.

After material transfer, the container 25 is lowered so that the lip seal 40 disengages from the hopper outlet by a few millimeters. The caps 4, 27 are still secured together, and the hopper lip seal 36 is still in engagement with the bottom part of the cap 27 of the container 25 to maintain total containment of the dust etc. in the hopper 2, and in the container 25, so protecting the external environment against contamination. There is thus formed an annular gap 41 (FIG. 14) within the angle ring 34 which is isolated from the external environment and from the interior of the hopper 2, in which gap the edge 32 of the cap 4 of the hopper 2 is now situated. The angle ring 34 in this position has been lowered with the hopper by actuating the piston cylinder arrangements 37 to extend their pistons to lower the angle ring 34 rather than keeping it in its highest position as initially.

Figure 14:
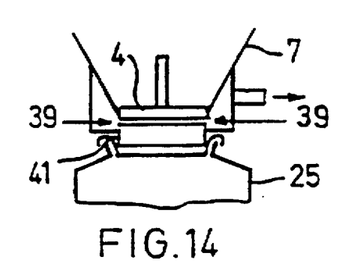
Figure 15:
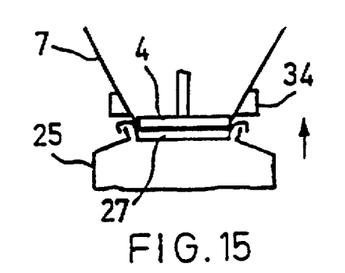
Figure 16:
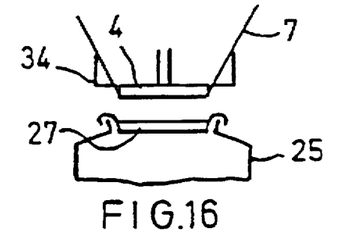

The jets 39 are located so that in the position of FIG. 14 they are directed to the free edges of the caps 4, 27 and between the junction of the cap 4 with the hopper throat 7. Wash medium such as air or liquid is directed through the jets 39, suitably in pulses, to clean these junctions of any adhered dust particles, and then these particles with the air or liquid are exhausted through the extraction duct 38 under vacuum. Alternatively, it may be possible in some circumstances to use a vacuum only to remove the dust. After the cleaning step, the container 25 is raised again (FIG. 15), the lift force of the actuators for raising it being set higher than the downward force of the piston/cylinder arrangements 37 so that the container 25 can move upwardly whilst maintaining a tight seal between the angle ring 34 and the lip seal 40 of the container 25 on which the angle ring 34 is seated. The angle ring 34 and the lip seal 36 thereof then re-engage the outer surface of the hopper throat 7 to seal this outer surface completely and which had previously been exposed to airborne dust, in however, minute quantities, in the volume (defined by the annular space 41) round the junction of the caps 4, 27.

The piston/cylinder arrangements 37 are than actuated so that the pistons pull the angle ring 34 upwards (as viewed) and hold it tightly to the outer surface of the hopper throat 7 as initially, and the container lip seal 40 is also pressed against the angle ring 34 in seating relation. The container is now lowered (FIG. 1).

It will be understood from the foregoing that during this sequence the annular space or chamber 41 defined by the angle ring 34 always maintains its integrity in that it is never exposed to the outside environment, to the interior of the hopper or to the interior of the container so that there is no environmental contamination nor any cross-contamination from one batch of material to the next.

It will also be understood in the drawings that parts such as air and vacuum lines have been omitted for clarity.

It will also be understood that in the invention where the α- and β-flanges or valve and bin lid seal together, after transfer of material and separation of the container, there is virtually no material left on the outside surfaces of either the valve or lid, and this clean effect is achieved without the use of a transfer chamber, which is novel, inventive and effective in providing a contamination-free environment.

I claim:

1. An apparatus for discharging flowable material, comprising:

a hopper for the material having a discharge outlet with a closure arranged to sealingly cooperate with a closure of a receptacle and, spaced from the outlet within the hopper, a device for obturating flow of material towards the outlet; and a mechanism, within the hopper, which is connectible with the obturating device and is operative to open the discharge outlet closure and the obturating device in sequence.

2. An apparatus according to claim 1, wherein the mechanism is disposed under the obturating device when the apparatus is discharging flowable material.

3. An apparatus according to claim 1, wherein the discharge outlet closure has a part of complementary internal configuration closure, whereby, on engagement, the parts seal with one another.

4. An apparatus according to claim 3, wherein said mechanism includes a suction means, disposed within an outer form of the discharge outlet closure, for opening and closing the receptacle closure.

5. An apparatus according to claim 4 wherein the discharge outlet closure and suction means are carried by a transverse beam which is shiftable by actuating means of the mechanism.

6. An apparatus according to claim 5, wherein the actuating means comprises bellows means.

7. An apparatus according to claim 6, wherein the beam supporting supports, via vibration isolators, a device for securing the mechanism centrally of the obturating device.

8. An apparatus according to claim 7, wherein the securing device comprises an inflatable annular device.

9. An apparatus according to claim 1, further including a vibrator means for vibrating the flowable material, so as to provide a smooth discharge.

10. An apparatus according to claim 9, wherein the vibrator means cooperates adapted with the obturating device.

11. An apparatus according to claim 1, wherein the discharge outlet closure and at least part of the mechanism are housed in a collapsible shroud.

12. In combination, an apparatus according to claim 1 and a receptacle for flowable material which has a closure for an inlet for material and an annular lip seal at the inlet.

13. A combination according to claim 12, wherein the inlet includes an annular rim on which the closure of the receptacle is received in a closed position of the inlet.

14. A combination according to claim 13, wherein the closure of the receptacle has stop means against which the discharge outlet closure of the hopper abuts.

15. An apparatus according to claim 1, further comprising:

isolation means associated with the discharge outlet of the hopper for isolating the discharge outlet and means to extract material from within the isolation means.

16. An apparatus according to claim 15, wherein the annular ring comprises an angle ring, a flexible skirt, and means to maintain the annular ring in position against the hopper discharge outlet.

17. An apparatus according to claim 16, wherein the means to maintain the annular ring comprises a plurality of piston and cylinder arrangements.

18. An apparatus according to claim 16, wherein the annular ring includes means to direct washing fluid towards the hopper discharge outlet.

19. An apparatus according to claim 16, wherein the annular ring includes vacuum means for cleaning the hopper discharge outlet.

20. An apparatus including a hopper for flowable material, comprising:

isolation means associated with an outlet of the hopper for isolating the outlet from the exterior, the isolation means comprising an annular ring, and means to extract material from within the isolation means, wherein the annular ring comprises an angle ring, a flexible skirt, and means, including a plurality of piston and cylinder arrangements, to maintain the annular ring in position against the hopper outlet.

21. An apparatus including a hopper for flowable material, comprising:

isolation means associated with an outlet of the hopper for isolating the outlet from the exterior, the isolation means comprising an annular ring, and means to extract material from within the isolation means, wherein the annular ring comprises an angle ring, a flexible skirt, means to maintain the annular ring in position against the hopper outlet, and means to direct washing fluid towards the hopper outlet.

22. An apparatus including a hopper for flowable material, comprising:

isolation means associated with an outlet of the hopper for isolating the outlet from the exterior, the isolation means comprising an annular ring, and means to extract material from within the isolation means, wherein the annular ring comprises an angle ring, a flexible skirt, means to maintain the annular ring in position against the hopper outlet, and vacuum means for cleaning the hopper outlet.

* * * * *